United States Patent
Narayanaswamy et al.

(10) Patent No.: US 7,861,243 B2
(45) Date of Patent: Dec. 28, 2010

(54) AUTOMATICALLY DEPLOYING PROGRAM UNITS TO A CLUSTER OF NETWORKED SERVERS

(75) Inventors: Sreedhara Narayanaswamy, Plano, TX (US); Gerald L. Boyd, Trenton, TX (US)

(73) Assignee: Computer Associates Think, Inc., Islandia, NY (US)

( * ) Notice: Subject to any disclaimer, the term of this patent is extended or adjusted under 35 U.S.C. 154(b) by 1595 days.

(21) Appl. No.: 10/782,980

(22) Filed: Feb. 20, 2004

(65) Prior Publication Data
US 2005/0010926 A1 Jan. 13, 2005

Related U.S. Application Data

(60) Provisional application No. 60/486,693, filed on Jul. 11, 2003.

(51) Int. Cl.
 G06F 9/44 (2006.01)
 G06F 9/445 (2006.01)
(52) U.S. Cl. ........................... 717/177; 717/172
(58) Field of Classification Search ......... 717/168–178, 717/147
 See application file for complete search history.

(56) References Cited

U.S. PATENT DOCUMENTS

| | | | | |
|---|---|---|---|---|
| 6,871,345 | B1 * | 3/2005 | Crow et al. | 717/175 |
| 6,996,832 | B2 * | 2/2006 | Gunduc et al. | 719/331 |
| 7,051,316 | B2 * | 5/2006 | Charisius et al. | 717/103 |
| 7,069,553 | B2 * | 6/2006 | Narayanaswamy et al. | 717/173 |
| 7,080,361 | B2 * | 7/2006 | Aigen | 717/137 |
| 7,139,821 | B1 * | 11/2006 | Shah et al. | 709/224 |
| 7,284,039 | B2 * | 10/2007 | Berkland et al. | 709/219 |
| 2002/0104071 | A1 * | 8/2002 | Charisius et al. | 717/109 |
| 2003/0018699 | A1 | 1/2003 | Matthews et al. | |
| 2003/0097551 | A1 | 5/2003 | Fuller, III et al. | |
| 2004/0177352 | A1 * | 9/2004 | Narayanaswamy et al. | 717/169 |

FOREIGN PATENT DOCUMENTS

| | | |
|---|---|---|
| EP | 1 050 813 A2 | 4/2000 |
| WO | WO 02/065283 A2 | 8/2002 |

OTHER PUBLICATIONS

BEA Takes Bite Out of Microsoft Pie, Gavin Clarke, Apr. 1, 2002, 3 pages.*
BEA Web Logic Portal, Deplyment Guide, version 4.4, May 2002, whole manual.*
International Search Report; International Application No. PCT/US04/21832, mailed Dec. 8, 2006.

(Continued)

Primary Examiner—Jason D Mitchell
(74) Attorney, Agent, or Firm—Baker Botts L.L.P.

(57) ABSTRACT

A system and method for assembling and deploying program units to application servers uses cluster deployment flow (CDF) architecture to allow users to automatically deploy to a cluster of application servers. The method in one aspect includes assembling one or more program units for deploying to a cluster of networked servers. The method also includes retrieving information related to the cluster of networked servers, generating deployment descriptors from the information, and deploying the one or more program units to the cluster using at least the deployment descriptor.

24 Claims, 2 Drawing Sheets

OTHER PUBLICATIONS

Written Opinion of the International Searching Authority; International Application No. PCT/US04/21832; Applicant: Computer Associates Think, Inc, mailed Dec. 8, 2006.

EPO Communication pursuant to Article 94(3) EPC, Reference No. HCD/J00048474EP, Application No. 04756769.8-1243, 5 pages, Aug. 25, 2009.

Search Report, EPO Communication, Reference No. HCD/J00048474EP, Application No. 04756769.8-1243/1649648 PCT/US2004021832, 3 pages, 2008.

Takagiwa et al., "WebSphere Studio Application Developer Programming Guide," ibm.com/redbooks, XP-002505111, 3 pages plus pp. iii-xviii and 419-440, Aug. 5, 2002.

* cited by examiner

AUTOMATICALLY DEPLOYING PROGRAM UNITS TO A CLUSTER OF NETWORKED SERVERS

CROSS-REFERENCE TO RELATED APPLICATIONS

The present application is related to U.S. patent application Ser. Nos. 10/378,503 and 10/378,504, which disclosures are incorporated herein by reference in their entirety. The present application claims the benefit of U.S. Provisional Application No. 60/486,693, filed Jul. 11, 2003, the entire disclosure of which is incorporated herein by reference.

TECHNICAL FIELD

The present application relates to enterprise management systems, and particularly, to a system and method for assembling and deploying program components to a cluster of servers in a network.

BACKGROUND

Middle tier applications, also referred to as application servers, typically operate on top of a wide range of existing enterprise systems such as database management systems, transaction monitors, and naming and directory services. Many of these application servers are built based on standard specifications such as the Java 2 Platform, Enterprise Edition (J2EE) to provide portability and scalability to applications managing and accessing various enterprise systems.

J2EE, for example, defines a specification for developing enterprise applications to follow as a standard. J2EE bases the enterprise applications on standardized, modular components, by providing a set of services to those components, and by handling many details of application behavior automatically. J2EE includes support for Enterprise JavaBeans (EJB) components, Java Servlets API, JavaServer Pages, and Extended Marked-up Language (XML) technology.

Accordingly, an application built conforming to the J2EE standard specification may be deployed to an application server, local or remote, or a cluster of application servers that supports the J2EE standards, thus allowing the deployed application to manage and access various resources provided by the underlying enterprise systems via the application server.

Clusters are sets of servers that are managed together and participate, for example, in workload management. The servers that are members of a cluster can be on different host machines. An example of an application server that supports clustering is the Websphere application server. Websphere is a set of Java-based tools from IBM that allows customers to create and manage business web sites with Java applications or servlets.

Briefly, deployment is the process of distributing and configuring various part of application programs such as J2EE applications to appropriate locations in application servers. In many cases, deployment process is vendor specific and requires manual steps. Further, deploying applications to a remote or cluster of application servers can require additional knowledge and steps.

SUMMARY

A system and method for automatically deploying program units to a cluster of application servers is provided. The method in one aspect includes assembling one or more program units for deploying to a cluster of networked servers. The method also includes retrieving information related to the cluster of networked servers, generating deployment descriptors from the information, and deploying the one or more program units to the cluster using at least the deployment descriptor.

In another aspect, the assembling and retrieving information may be performed interactively utilizing a user interface that retrieves information related to the one or more program units and user preferences from the user.

The system for automatically deploying program units to a cluster of networked servers includes data source management module operable to retrieve data source information from an application server to which to deploy one or more program units. The system also includes cluster management module operable to retrieve cluster information related to the application server, and container management module operable to retrieve container information related to the application server. The data source information, cluster information, and container information are used to automatically deploy the one or more program units to a cluster of networked servers.

Further features as well as the structure and operation of various embodiments are described in detail below with reference to the accompanying drawings. In the drawings, like reference numbers indicate identical or functionally similar elements.

DETAILED DESCRIPTION

The present disclosure describes a system and method for assembling and deploying software or program units, also referred to as program files or program modules to a middle tier applications or application servers such as the IBM Websphere cluster. EJBs to be deployed need not have been generated by a particular assembly tool provided in the target application server. The system and method in one embodiment uses a cluster deployment flow (CDF) architecture to allow users to automatically deploy program units to an application server cluster.

The system and method, in one embodiment, may be implemented as a plug-in, for example, to be used in conjunction with a universal deployment tool such as the one described in the co-pending U.S. patent application Ser. No. 10/378,504. A user interface such as the one described in that application may be provided to guide a user through this single deployment process.

Assembling EJB components typically includes packaging classes into JAR (Java archive) and WAR (Web archive) files, creating EAR (EJB archive) file, and generating deployment descriptor files, among other tasks. When operated in conjunction with the deployment tool described in the U.S. patent application Ser. No. 10/378,504 or a similar tool, the CDF system and method of the present disclosure in one embodiment allows assembling of one or more EJBs, generating application server suitable deployment descriptors, and deploying the components to the application server cluster such as the Websphere cluster.

In the following description, well-known functions and components are not described in detail. Thus, many known features and definitions related to J2EE standard specification and Java programming methods are not described in detail. Also in the following description, a Websphere cluster is used as an example of a target application server cluster, however, it should be understood that the disclosed method and system may be used to deploy to other application servers having similar deployment schemes.

Figure 1:
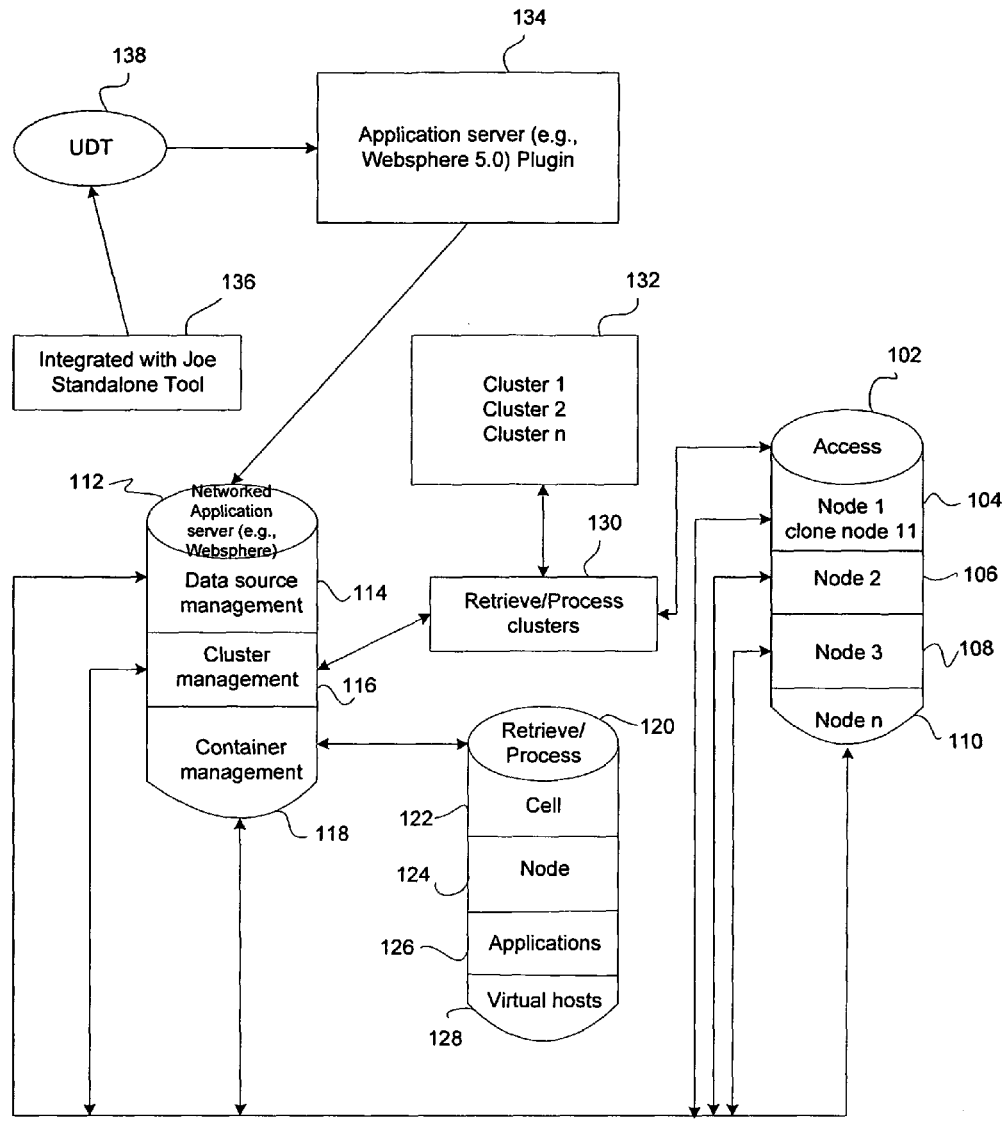
FIG. 1 is an architectural diagram illustrating the cluster deployment flow in one embodiment.

FIG. 1 is an architectural diagram illustrating the cluster deployment flow in one embodiment. An application server cluster 102 may include application servers on node 1 104, node 2 106, node 3 108, and node n 110 on supported platforms such as Windows, Linux, Solaris, AIX, OS/400 and/or OS/390. Clusters are sets of servers that are managed together and participate in workload management.

As disclosed in U.S. patent application Ser. No. 10/378, 503, which has been incorporated herein by reference in its entirety, the network deployment server 112 of the present disclosure includes a deployment tool that uses a plug-in architecture to isolate and modularize application specific functionalities and properties unique to each application server 102-110. Examples of the unique functionalities and properties may include application server specific security information and factors such as whether caching is to be performed. Other application server specific criteria include a particular location of an application server where the EAR file needs to be stored, whether an EAR file needs to be preprocessed to include application server required classes. Further, many application servers generally require that application server specific deployment descriptors be used.

Accordingly, application specific deployment configuration and functionalities for a given target application server 102-110 are encapsulated into a plug-in module 134 or that target application. The plug-in modules 134 implement a plug-in deployer interfaces and other helper interfaces to effect communication between the classes that implement the deployment wizard interface.

In one embodiment, the deployment tool 112, requests a server profile selection to determine which server profile is to be used to deploy a specified package of components or applications such as the archive J2EE application (EAR) file. For example, one or more plug-ins that are currently installed are determined and used to form a list of available target servers. That is, if an IBM Websphere plug-in is installed, then the Server Profile Manager deployment tool returns IBM Websphere application server as one of the candidate target servers.

In one embodiment, a server profile panel is presented to a user to select a target server from a list of target servers determined as described above. A user may select one from the list or may specify a new target application server 102-110, creating a new server profile and installing a plug-in 134 associated with the new server.

A plug-in 134 refers to an accessory program that enhances a main application. Plug-ins 134 are program units that may be added to the main application without affecting the main application. Because the deployment tool 112 of the present disclosure uses a plug-in architecture for application specific functionalities, additional target application servers 102-110 may be added easily by, for example, adding plug-ins 134 for those new target application servers 102-110. Accordingly, new application servers 102-110 for deployment may be added dynamically without having to change or modify other parts of the deployment tool 112.

Typically, a deployer, that is, a person performing the deployment selects a server type and defines a server profile that is used to save deployment settings. Server profile may already have been created previously, for example, from a previous deployment session to the same application server. Server profiles are created for servers that have corresponding plug-ins 134 that implement the deployer interface. For example, server profiles are created and saved by the server profile manager and are populated with the information provided by the user during the deployment process. Server profiles store information needed by the plug-in 134, including such information as the profile name, host name, and the port number. Other information in a server profile may include the type of deployment platform, file transfer protocol ("ftp") user identifier ("id"), ftp password, and deployment directory. Additional information needed for a particular application server 102-110 may be requested from the user during the deployment process and stored in the server profile.

Once a plug-in implements the deployer interface, the deployment tool 112 may determine which platforms are supported by the plug-in 134 by invoking an instance of the plug-in method that implements the deployer interface. For example, a class in the plug-in implementing an interface provided for communicating platform information to the deployment tool class, for instance, the MultiPlatformPlugin interface defining getplatforms method, may provide a list of the platforms supported by that particular plug-in. After a platform is selected as shown at, a corresponding plug-in is activated to package the EAR file.

A deployer helper interface may be used by the plug-ins 134 and provides access to one or more methods for requesting services of the deployment tool classes implementing the deployment wizard interface. For instance, after the EAR file is packaged, a user may edit the deployment descriptors using the deployer helper interface. The deployer helper interface is passed to a plug-in, when the plug-in is activated by the deployment tool. Prior to displaying a summary page for a packaged EAR file, the deployment tool may optionally display the contents of the packaged EAR file to be modified. The modifications may be performed using the helper interface dialogs or by using a provided XML editor.

The packaged EAR file is then deployed to the selected target application server 102-110 using the deploy method implemented by the plug-ins 134. For instance, the deploy method may be invoked by the deployment tool 112. Although EJB.ear may include components that are being packaged and deployed, the deployment tool 112 of the present disclosure is enabled to handle a complete EAR file, which may contain both the EJB and web application components, and other files. Deployable components may be created by using any one of the available enterprise development environment tools. One such tool is Advantage Joe 3.0, which provides capability for modeling, building, and deploying components onto an application server. The disclosed deployment tool 112, in one embodiment, combines the Java archives (JAR) files and incorporates them into Enterprise archive (EAR) files, which may then be deployed to a target application server; regardless of which tools were used to create the JAR files and EAR files.

JAR files typically include one or more J2EE modules making up a J2EE application. A J2EE module is a collection of one or more J2EE components of the same component type such as web and EJB. Each J2EE module typically includes a corresponding deployment descriptor that contains declarative data required during the deployment of the components in the module.

A J2EE application includes one or more J2EE modules and one J2EE application deployment descriptor. J2EE application deployment descriptor generally describes the WAR and EJB JAR files and includes security and database information specific to the application, if any. A J2EE application is packaged using the Java archive (JAR) file format into a file with ear filename extension. When composing a J2EE application, J2EE modules used in the application are selected, an application directory structure is created, J2EE module deployment descriptors are created, a deployment descriptor for the J2EE application is created, and the J2EE application is packaged.

Alternatively, a deployment tool of the sent disclosure, may receive input in the form of module selection and model information, for example, if the deployment tool 112 is being invoked as part of a development environment. That is, when operating as an integrated part of a development tool 112 such as Advantage Joe, the deployment tool 112, in one embodiment, is supplied with development tool's information model, a directory of J2EE modules packaged in JAR files, and a project selection.

A development tool's information model may include detailed information about the application such as description of the classes and internal logic and relationships between the classes. A project selection may be used to build and deploy project related objects, for example, by selecting from a list of objects including classes, specifications, methods, parameters, projects, and jars. Accordingly, a project selection allows the deployment tool 112 to locate the particular project output built using a development environment tool 112. This output may include an output directory containing classes resulting from the build process and also any applicable jar files created during the build process in the development environment tool. The deployment tool 112 in the present disclosure may use the project selection information to access the development tool's information model and the output directory in order to package the J2EE modules into an EAR file.

In a particular embodiment, the EAR file may be expanded into its individual components so that one or more deployment descriptors in the EAR file may be extracted and modified. The deployer interfaces provided in the present disclosure may be used to modify the deployment descriptors. For instance, although the supplied or constructed EAR files contain deployment descriptors, these descriptors may need to be modified prior to the actual deployment to a target application server. As known to those skilled in the art, a deployment descriptor refers to an XML file provided for each module and application, and describes how the modules and applications are to be deployed.

In a particular embodiment, the target application server to which the EAR file is to be deployed may be selected. The selection may, for example, be determined by presenting the user with a list of available application servers that have corresponding plug-ins 134 and allowing the user to select an application server from the list. In addition, the user may be given an option to enter a new application server not listed in the list. Thereafter, a plug-in corresponding to the selected application server may be dynamically loaded. Any other plug-ins that are available may also be dynamically loaded at this time. A profile may then be created for the selected application server if one does not exist already. For example, a new application server may need a corresponding application server profile created. This application server profile includes information such as the host name and the port number of the target application server to which the EAR files is being deployed. A validity check may then be performed to make sure that the EAR file includes a valid version of a deployment descriptor and conforms to valid data type definitions (DTD). The deployment descriptors may be XML files and, therefore, may need to be associated with a valid document type declaration provided in a DTD. If the DTD needs to be edited, appropriate changes may be made to DTD.

For example, a user wanting to include any application server security tags for the deployment may edit the DTD file. The EAR file is repackaged. The repackaged EAR file may contain modified DTD FILE and descriptors. A target platform for the selected application server may then be selected. The selection may be determined, for example, by presenting a list of platforms that the selected application server runs on, and allowing the user to select a platform server from the list. The list of platforms supported by the selected application server is provided by the corresponding plug-in via, for example, the plug-in interface method implemented by the corresponding plug-in. Thereafter, the deployment process may begin. The deployment process may begin, for example, if a user presses a finish button after having selected a platform from the list of the platform presented to the user. In this case, the user pressing the finish button, or performing any analogous activity to indicate that all customizations pertaining to the selected application server are complete, triggers a deploy method implemented by the plug-in to be invoked.

The cluster deployment flow (CDF) in one embodiment includes application server (such as Websphere) administrative management components comprising data source management 114, cluster management 116, and container management 118. The data source management 114 retrieves and processes the information about the data sources that are available for each node configured in the cluster. For instance, in the case of the Websphere application server, data source management 114 retrieves data sources from a network deployment server of the application server 112. The retrieved data sources are presented to the user. The user may change the data source information or proceed with the existing data source bundled with the EJB.jar file.

An example of the retrieved data sources include shipment component data source such as "ShipmentComponent(cells/WebSpere2Network/nodes/Websphere2:resources.xml1#DataSource_1)." This information is filtered and retrieved from an existing application server's deployment server such as the Websphere 5.0 Network deployment server 112 using, for example, JACL script. Thus, in one embodiment, the data source management lists the data sources.

The cluster management 116 retrieves the cluster information and provides the cluster information to the user to select the appropriate target cluster to deploy the EJB. For instance, the cluster management 116 retrieves and processes the information of the cluster that are configured for an application server's deployment server such as the Websphere 5.0 Network deployment server. An example of cluster information is "snscluster1(cells/WebSphere2Network/clusters/snscluster1:cluster.xml#snscluster1)." Snscluster1 is a cluster in network deployment server. The information related to the snscluster1 is retrieved, for example, using a JACL script.

The container management 118 retrieves and processes information about the cell, node, and applications that are deployed on the cluster of application servers, virtual hosts for each node in a cluster for all the cluster that are configured for the application server's deployment server. For example, the container management 118 retrieves the application names, nodes, server names, and virtual hosts information using a JACL script. Examples of retrieved information include "WebSphere2(cells/WebSphere2Network/nodes/WebSphere2:node.xml1#Node_1)," where WebShpere2 is the name of a node; "server1(cells/WebSphere2Network/nodes/WebSphere2/servers/server1:server.xml#Server_1)," where server1 is a server; default_host(cells/

WebSphere2Network:virtualhosts.xml#VirtualHost_1)," where default_host is a virtual host; and "ShipmentTechnologySamples," where shipment and technology samples are the applications already deployed onto the network deployment server.

Briefly, a cell is a repository of nodes in an application server such as the Websphere Application Server. Cell is arbitrary, logical grouping of one or more nodes in an application server distributed network. A node refers to an application server installed on a machine. A node is within a cell in the application server. A cell can have multiple nodes. In one embodiment, a cell is unique to a machine and a node is a logical grouping of managed servers.

A virtual host is a configuration enabling a single host machine to resemble multiple host machines. Resources associated with one virtual host do not share data with resources associated with another virtual host, even if the virtual hosts share the same physical machine. Virtual hosts allow the administrator to isolate, and independently manage, multiple sets of resources on the same physical machine.

Servers that belong to a cluster are members of that cluster set and all have identical application components deployed on them. Other than the applications configured to run on them, cluster members need not share any other configuration data. One cluster member may be running on a huge multi-processor enterprise server system while another member of that same cluster may be running on a small laptop. The server configuration settings for each of these two cluster members may be very different, except in the area of application components assigned to them. In that area of configuration, they are identical.

In one embodiment, the container management 118 indicates the final stage of a deployment process, which creates all the appropriate JNDI bindings and deploys the EJB through the JACL script.

In one aspect, a user is provided with a choice to deploy new program modules or to redeploy existing program modules. If the user selected to deploy new application program modules, the program modules such as the Enterprise JavaBeans are deployed to the target application server for that cluster to a set of nodes. In this case, the node in a cluster is cloned and the program modules are deployed to the target node as well as the cloned node for that cluster. For example, referring to FIG. 1, the program modules are deployed to node 1 and cloned node 11 104. Clones may be created, for instance, by users during cluster creation in the Websphere. For example, during the cluster creation in the Websphere, a user can add a node and clone that specific node. Thus, the cluster will have a set of nodes in which the nodes in the set may be cloned by the user while creating the cluster. Creating clusters in the Websphere application servers are known to those skilled in the art, therefore, will not be further described.

In one aspect, a script, for example, a JACL script is generated automatically to use the third party application server's specific utility (such as wsadmin for Websphere) to deploy the program modules.

If the user selects an existing application from a cluster, then a script such as the JACL script (scripting language for Java platforms) may be generated to use the third party application server's specific utility (such as wsadmin for Websphere) to re-deploy the program modules for that cluster to a set of nodes having the application servers installed.

Figure 2:
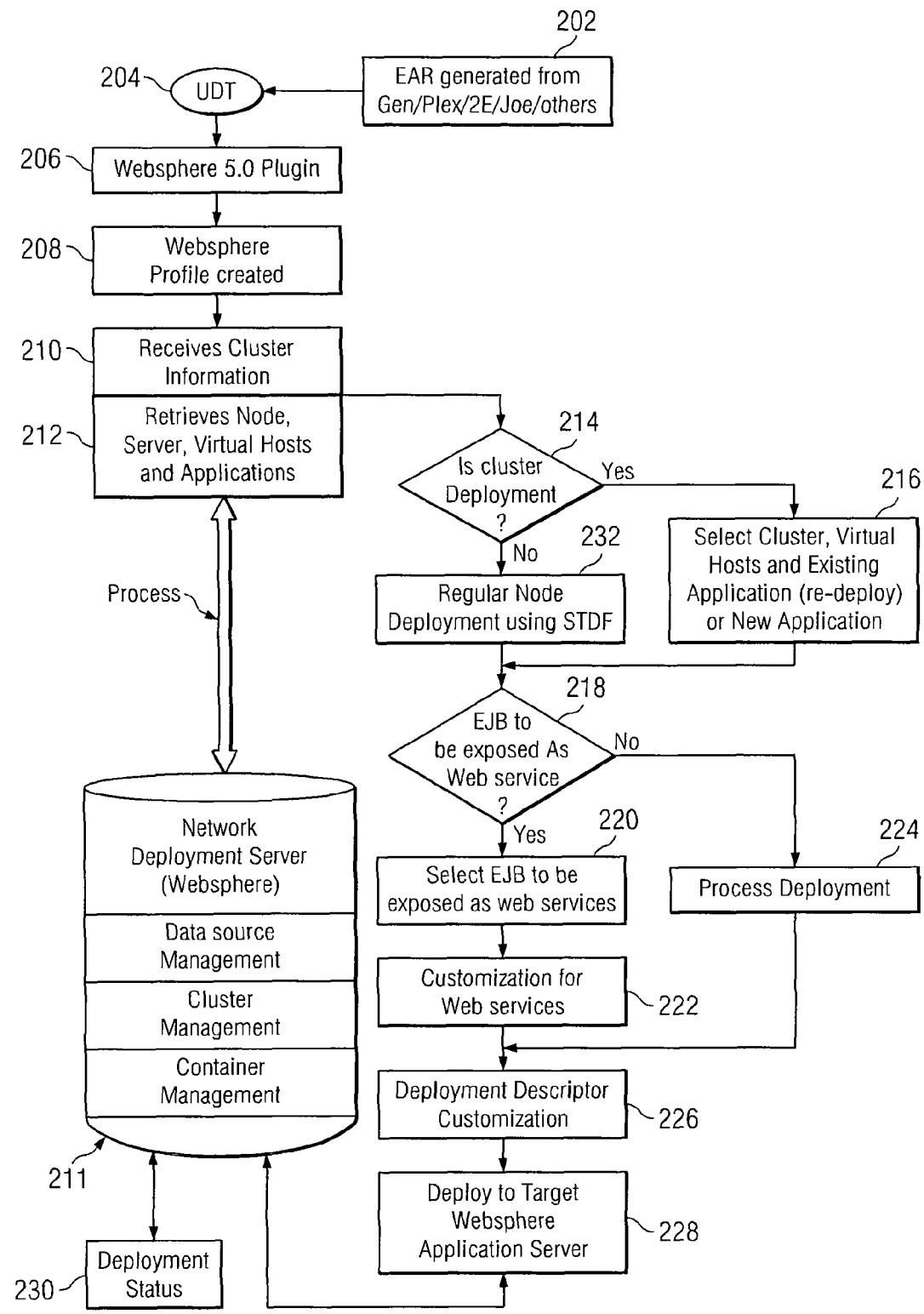
FIG. 2 is a functional diagram illustrating an overview of the cluster deployment flow in one embodiment.

FIG. 2 is a functional diagram illustrating an overview of the cluster deployment flow in one embodiment. The enterprise archive (EAR) of the Enterprise JavaBeans, which may include an Enterprise JavaBean and Web application are generated and packaged from such tools as Joe, Gen, Plex, 2E, or other tools. At 204, the EAR are accessed through the Universal Deployment tool (UDT) of Advantage Joe 3.1, for deployment to a deployment server such as the Websphere 5.0 network deployment server. At 206, the UDT dynamically loads the application server plugin such as the Websphere 5.0 Plugin to perform the cluster deployment. At 208, specific application server profile such as the Websphere 5.0 Profile is created for the target Websphere Network deployment server.

At 210, information about the cluster is retrieved from a deployment server such as the network deployment server for the Websphere applications (211). At 212, information about the nodes, servers, virtual hosts, and applications deployed are retrieved from the deployment server such as the network deployment server for the Websphere applications (211). A cluster may have multiple nodes and clones.

A user has a choice to do the cluster deployment or regular deployment using the Single Transparent Deployment Flow (STDF). At 214, if cluster deployment is selected, then the cluster information, virtual hosts information, and applications already deployed onto clusters are listed. At 216, a user may select cluster, virtual hosts, and existing applications for redeployment or new applications for new deployment. At 214, if regular node deployment using STDF is selected, regular node deployment is performed at 232, for example, as described in U.S. patent application Ser. No. 10/378,504.

A user may be given a choice to expose the Enterprise Java Beans as web services at 218. For instance, a user has a choice to select the enterprise application and deploy it as web services. The enterprise application, for example, JavaBeans and points are generated for web services. A web service can be published in a directory where a web service browser can locate the information needed to access the web service. Since the enterprise Javabean (EJB) can be accessed as a web service which can appear in a directory, the EJB is considered to be exposed. At 220, if a user selects to expose the Enterprise Java Beans as web services, then at 222, web services customization is done to expose the EJB as web services. The customization may include creating the interface description information, additional classes and files needed to allow the EJB to be accessed as a web service. If at 218, no EJBs are to be exposed as web services, deployment process takes place at 224.

Deployment process, for example, may include generating Apache SOAP deployment descriptor for the EJB and executing the Websphere IBM "SoapEarEnabler.bat" command line utility. This tool may be used to package one or more web services in a Websphere EAR file. After executing this utility, one or more new WAR files will have been added to the EAR file. Deployment process may also include generating a WSDL document for the EJB session bean using the Apache Axis Java2WSDL generation tool. The resulting WSDL document may then be added to the SOAP WAR file so that it is hosted by the web service web application.

At 226, a user may choose to customize any one or more of the deployment descriptor files such as ejb-jar.xml, web.xml, and application.xml files. For instance, a user may edit the ejb-jar.xml or web.xml or application.xml to include security tags or any websphere specific tags if required. This customization involves a merge after the user edits the ejb-jar.xml or application.xml or web.xml file. The merge updates the changes made by the user to the appropriate ejb-jar.xml or application.xml or web.xml files and creates the EJB.jar and EJB.ear files.

At 228, EJB.ear is processed by creating the appropriate JNDI bindings, Websphere deployment descriptor files and deploys it to the target cluster of the network deployment server. JNDI bindings, for example, are created for each of the EJB.jar in the EJB.ear file. The JNDI bindings have the information about the EJB JNDI name and the datasource information. The META-INF/ibm-ejb-jar-bnd.xmi META-INF/ibm-ejb-jar-ext.xmi are created in each of the EJB.jar file and packaged into EJB.ear. The processing at 228 is performed, for example, when a user clicks a "finish button" on a user interface or otherwise indicates the user is finished with selecting available options and is ready for deployment.

At 230, the status of the deployment is reported back in the UDT. For instance, the deployment status is retrieved from the Websphere network deployment server. The deployment status is retrieved from the deployment JACL scripts. Deployment status in one embodiment indicates whether the EJB deployed successfully or failed. The appropriate IBM Websphere exception message may be displayed onto a deployment console.

The system and method of the present invention may be implemented and run on a general-purpose computer. The embodiments described above are illustrative examples and it should not be construed that the present disclosure is limited to these particular embodiments. Various changes and modifications may be effected by one skilled in the art without departing from the spirit or scope of the invention as defined in the appended claims. For example, although the system and method disclosed herein has been described with respect to J2EE and Java environment, and Websphere application server as an example for ease of explanation, it is not limited only to such programming environment. Accordingly, the present invention is not limited except as by the appended claims.

We claim:

1. A method of automatically deploying program units to a cluster of networked servers, comprising:
   assembling one or more program units for deploying to a cluster of one or more application servers;
   retrieving type information related to the cluster of networked servers from a deployment server, the type information identifying a type of application server installed on one or more nodes to which to deploy the program units;
   using a universal deployment tool to dynamically load an application server plugin to perform cluster deployment on the type of application server, wherein the application server plugin:
      is dynamically loadable by the universal deployment tool upon receiving a user identification of the cluster of one or more application servers;
      corresponds to at least one of the application servers in the cluster of one or more application servers; and
      encapsulates deployment configurations associated with the one or more program units, the deployment configurations corresponding to the at least one of the application servers;
   automatically, and without user input, using the dynamically loaded application server plugin to generate a script to use a specific utility of the application server for generation of deployment descriptors from the type information retrieved from the deployment server, the deployment descriptors suitable for the type of application server; and
   deploying the one or more program units to the cluster of the one or more application servers using at least the deployment descriptor.

2. The method of claim 1, further comprising creating naming and directory interface binding files.

3. The method of claim 1, wherein the retrieving comprises automatically retrieving information related to the one or more application servers in the cluster.

4. The method of claim 3, further comprising:
   dynamically allowing a user to select from the one or more application servers.

5. The method of claim 1,
   wherein the retrieving comprises:
   automatically retrieving information related to one or more virtual hosts in the cluster.

6. The method of claim 5, further comprising:
   dynamically allowing a user to select from the one or more virtual hosts.

7. The method of claim 1, wherein the assembling further comprises providing a user interface to gather information from a user about the one or more program units being deployed.

8. The method of claim 1, wherein the cluster of networked servers includes at least an application server and one or more clones of the application server.

9. The method of claim 1, further including allowing re-deploying of already deployed one or more program units to the cluster.

10. The method of claim 1, wherein the retrieving comprises:
   automatically retrieving information related to one or more virtual hosts in the cluster.

11. The method of claim 10, further comprising:
   dynamically allowing a user to select from the one or more virtual hosts.

12. The method of claim 1, further comprising:
   after the automated generation of the deployment descriptors, receiving a user customization of the deployment descriptors; and
   merging the user customization with the automatically generated deployment descriptors to update the automatically generated deployment descriptors according to the user customization.

13. The system of claim 1, wherein:
   the cluster of one or more application servers comprises a plurality of application servers;
   at least one of the plurality of application servers comprises a new application server; and
   using the universal deployment tool to dynamically load the application server plug-in to perform cluster deployment comprises:
      installing a new application server plug-in for the new application server, the new application server plug-in encapsulating deployment configurations associated with the one or more program units, the deployment configurations corresponding to the new application server; and
      dynamically loading the new application server plug-in.

14. A program storage device readable by machine, tangibly embodying a program of instructions executable by the machine to perform method steps of automatically deploying program units to a cluster of networked servers, comprising:
   assembling one or more program units for deploying to a cluster of networked servers;
   retrieving type information related to the cluster of networked servers from a deployment server, the type information identifying a type of application server installed on one or more nodes to which to deploy the program units;

using a universal deployment tool to dynamically load an application server plugin to perform cluster deployment on the type of application server, wherein the application server plug-in:
is dynamically loadable by the universal deployment tool upon receiving a user identification of the cluster of networked servers;
corresponds to at least one of the networked servers in the cluster of networked servers; and
encapsulates deployment configurations associated with the one or more program units, the deployment configurations corresponding to the at least one of the networked servers;
automatically, and without user input, using the dynamically loaded application server plugin to generate a script to use a specific utility of the application server for generation of deployment descriptors from the type information retrieved from the deployment server, the deployment descriptors suitable for the type of application server; and
deploying the one or more program units to the cluster using at least the deployment descriptor.

15. The program storage of claim 14, further comprising: creating naming and directory interface biding files.

16. The program storage of claim 14, further comprising: after the automated generation of the deployment descriptors, receiving a user customization of the deployment descriptors; and
merging the user customization with the automatically generated deployment descriptors to update the automatically generated deployment descriptors according to the user customization.

17. The program storage of claim 14, wherein:
the cluster of networked servers comprises a plurality of application servers;
at least one of the plurality of application servers comprises a new application server; and
using the universal deployment tool to dynamically load the application server plug-in to perform cluster deployment comprises:
installing a new application server plug-in for the new application server, the new application server plug-in encapsulating deployment configurations associated with the one or more program units, the deployment configurations corresponding to the new application server; and
dynamically loading the new application server plug-in.

18. A system automatically deploying program units to a cluster of networked servers, comprising:
an application server cluster comprising a set of a plurality of application servers, each application server running on a different host machine that comprises a processor; and
a network deployment server running on a deployment processor in communication with the application server cluster, the processor running the at least one network deployment server comprising:
data source management module operable to retrieve data source information from at least one data store, the data source information related to an application server to which to deploy one or more program units;
cluster management module operable to retrieve cluster information from the at least one data store, the cluster information related to the application server; and
container management module operable to:
retrieve container information from the at least one data store, the container information related to the application server cluster, the container information identifying a type of application server installed on one or more nodes; and
use a universal deployment tool to dynamically load an application server plugin to perform cluster deployment on the type of application server, wherein the application server plugin:
is dynamically loadable by the universal deployment tool upon receiving a user identification of the application server cluster;
corresponds to at least one of the application servers in the application server cluster; and
encapsulates deployment configurations associated with the one or more program units, the deployment configurations corresponding to the at least one of the application servers;
automatically, and without user input, use the dynamically loaded application server plugin to generate a script to use a specific utility of the application server for generation of deployment descriptors from the information retrieved container information, the deployment descriptors suitable for the type of application server;
wherein the data source information, cluster information, container information, and deployment descriptors are used to automatically deploy the one or more program units to the plurality of application servers.

19. The system of claim 18, further including:
a user interface module to retrieve information from a user related to one or more user preferences for deploying the one or more program units.

20. The system of claim 19, wherein the user interface module is further operable to allow the user to change the retrieved data source information.

21. The system of claim 19, wherein the user interface module is further operable to allow the user to select a target cluster from the retrieved cluster information, to which to automatically deploy the one or more program units.

22. The system of claim 18, wherein the container management module is further operable to:
after the automated generation of the deployment descriptors, receiving a user customization of the deployment descriptors; and
merging the user customization with the automatically generated deployment descriptors to update the automatically generated deployment descriptors according to the user customization.

23. The system of claim 18, wherein:
at least one of the plurality of application servers comprises a new application server; and
the container management nodule is operable to use the universal deployment tool to dynamically load the application server plug-in to perform cluster deployment by:
installing a new application server plug-in for the new application server, the new application server plug-in encapsulating deployment configurations associated with the one or more program units, the deployment configurations corresponding to the new application server; and
dynamically loading the new application server plug-in.

24. A method of automatically deploying program units to a cluster of networked servers, comprising:
assembling one or more program units for deploying to a plurality of application servers, at least one of the plurality of application servers comprising an existing application server and at least one of the plurality of application servers comprising a new application server;

retrieving type information related to the plurality of application servers from a deployment server, the type information identifying at least a type of the existing application server;

using a universal deployment tool to dynamically load a first application server plugin to perform cluster deployment on the type of the existing application server, wherein the first application server plugin corresponds to the existing application server and encapsulates deployment configurations associated with the one or more program units and corresponding to the existing application server;

installing a second application server plug-in to perform cluster deployment on the type of the new application server, wherein the second application server plugin corresponds to the new application server and encapsulates deployment configurations associated with the one or more program units and corresponding to the new application server;

using the universal deployment tool to dynamically load the second application server plugin to perform cluster deployment on the type of the new application server;

using the first and second application server plugins to deploy the one or more program units to the existing application server and the new application server.

* * * * *